US011125349B1

(12) United States Patent
Samayamantula (10) Patent No.: US 11,125,349 B1
(45) Date of Patent: Sep. 21, 2021

(54) ZERO RESTRICTION BALL VALVE INSERT, ONE-PIECE CAGE AND ASSEMBLY

(71) Applicant: Jyothi Swaroop Samayamantula, Midland, TX (US)

(72) Inventor: Jyothi Swaroop Samayamantula, Midland, TX (US)

( * ) Notice: Subject to any disclaimer, the term of this patent is extended or adjusted under 35 U.S.C. 154(b) by 0 days.

(21) Appl. No.: 16/805,679

(22) Filed: Feb. 28, 2020

(51) Int. Cl.
*F16K 15/04* (2006.01)
*F16K 27/02* (2006.01)

(52) U.S. Cl.
CPC .......... *F16K 27/0209* (2013.01); *F16K 15/04* (2013.01)

(58) Field of Classification Search
CPC .. F16K 15/04; F16K 27/0209; F16K 27/0245; B23P 15/001
USPC ........... 137/533.19, 533.13, 315.13; 166/328
See application file for complete search history.

(56) References Cited

U.S. PATENT DOCUMENTS

| | | | | |
|---|---|---|---|---|
| 1,597,088 | A * | 8/1926 | McCracken | F04B 53/14 137/533.13 |
| 2,294,568 | A | 4/1941 | Neilsen | |
| 3,491,790 | A | 1/1970 | Sanford | |
| 4,768,268 | A * | 9/1988 | Ishihara | B21K 1/20 29/890.132 |
| 5,183,068 | A | 2/1993 | Prosser | |
| 5,297,580 | A | 3/1994 | Thurman | |
| 5,507,312 | A | 4/1996 | Dillman | |
| 5,593,292 | A * | 1/1997 | Ivey | F04B 53/1007 137/533.15 |
| 5,992,452 | A | 11/1999 | Nelson, II | |
| 6,007,314 | A | 12/1999 | Nelson, II | |
| 6,029,685 | A | 2/2000 | Carruth | |
| 6,685,451 | B1 * | 2/2004 | Ivey | F04B 47/02 137/533.19 |
| 7,069,997 | B2 * | 7/2006 | Coyes | F04B 53/1007 137/533.11 |
| 10,184,314 | B1 | 1/2019 | Bair et al. | |

(Continued)

FOREIGN PATENT DOCUMENTS

| | | |
|---|---|---|
| CA | 2435601 | 10/2006 |
| GB | 2144203 A | 2/1985 |

*Primary Examiner* — P. Macade Nichols (57) ABSTRACT

An improved one-piece cage and an improved insert and their assembly create a zero-restriction fluid flow ball check valve. The improved insert for ball and seat valve comprises external screw threads on the base of the insert and have circumferentially spaced ribs extending upwards and converging towards the longitudinal axis of the insert, forming a hemi-spherical ball stop and arched side openings. The inside diameter of the insert bore is substantially equal to the ball valve diameter preventing the ball from rattling when positioned in the improved insert's passageway during the fluid flow. The outside diameter of the ribs is less than the inside diameter of the improved one-piece cage cavity producing a zero-restriction fluid flow ball check valve in comparison to the volumetric fluid flow through the annular seat. The improved cage that receives the improved insert is a one piece in construction and has internal threads that correspond to the external threads on the improved insert. The insert is assembled inside the cage using a screw thread connection and simultaneously forming a fluid seal between the insert and the cage.

10 Claims, 10 Drawing Sheets

(56) References Cited

U.S. PATENT DOCUMENTS

2010/0269928 A1\* 10/2010 Ford ...................... F16K 15/04
                                                                  137/533.11

\* cited by examiner

ZERO RESTRICTION BALL VALVE INSERT, ONE-PIECE CAGE AND ASSEMBLY

FIELD OF THE INVENTION

The present invention relates generally to a ball check valve of the type used in downhole reciprocating pumps of the artificial lift system. More particularly, relates to an improved insert, a one-piece cage and their assembly for ball check valve.

BACKGROUND

In hydrocarbon recovery operations, an artificial lift system is typically used to recover fluids from a well in a subterranean earth formation. Common artificial lift systems include positive displacement reciprocating pumps such as "sucker rod pump". The pump comprises a plunger positioned within a barrel. The plunger is coupled to a lower end of a reciprocating rod or rod string, which may be referred to as "sucker rods" or "rod string". Plunger is a part of the traveling assembly and the barrel is a part of the standing assembly. A traveling valve is located either above or below the plunger and a standing valve is located at the bottom of the barrel. The standing valve and the traveling valve each include a ball check valve. The traveling valve moves up and down under the action of a pumping unit. The movement of the traveling valve within the barrel draws the fluid to the surface.

The upward travel of the traveling valve may be referred to as "upstroke" and the downward travel may be referred to as "downstroke". On the upstroke the ball check valve in the traveling valve closes thereby causing the fluid situated above the traveling valve to be moved upward. Simultaneously, the ball check valve of the standing valve opens there by allowing fluid to enter the portion of the pump barrel located between the traveling valve and the standing valve. This portion of the pump barrel located between the traveling valve and the standing valve may be referred to as "pump intake". On the downstroke, the ball check valve opens thereby allowing fluid to pass through the traveling valve so that it can be lifted upward upon the next reciprocation thereof. Meanwhile, the ball check valve of the standing valve closes, preventing downward movement of fluid therethrough.

In general, ball check valves comprise a vertically oriented cylindrical cage/housing and a ball positioned in the cage allowing continuous opening and closing of the valve. The cage comprises of ball guides and ball stop to keep the ball inside the cage. In other cases, the ball is positioned in an insert and the insert is securely held inside the cage. A seat is positioned below the ball which provides a seal surface for the ball to sit while providing a fluid seal. The seat is held in its place with a seat plug screwed and torqued against the seat underneath. It has been found that in either of the scenarios where the ball is received inside, they do not provide a full open flow. This causes restriction in the flow area compared to the fluid flow area available through the seat underneath. Any such restriction in the fluid flow causes pressure drop, loss of production and inefficiency. Such fluid flow restriction also causes sucker rods to buckle in the downstroke. Such buckling causes sucker rods to break and rub against the well tubing. Which leads to holes in the well tubing and increases wear and tear in the entire pumping system causing premature failures.

Further more, referring to the prior art CA2435601C and general practice, a diametrical clearance of 0.762 mm [0.03 in] or greater is maintained between the ball and the inside bore of the insert, this causes the ball to rattle rapidly during the fluid flow through the valve. Such rattling action of the ball leads to premature failure either by cracking or wearing off the insert and the cage.

Traditionally the insert is securely held inside the cage using interference or shrink fit and friction welding methods. Two pieces of cage/housing is friction welded around the insert as shown in the prior art U.S. Pat. No. 6,029,685A. An interference or shrink fit between ball receiving insert and cage is formed by making the outside diameter of the insert equal to or bigger than the inside diameter of the cage cavity. Interference fit causes fluid restriction by restricting the fluid flow area around the ball. Interference fit also causes radial stress on the insert. Friction welding process subjects insert to undergo high axial compression stress. Such pre-stress causes the insert to crack while in service or during the assembly process. It is found that the friction welded cage breaks apart at the welded region when installed in high pressure deeper well bores causing the ball check valves to fail inside the pump.

Another way of holding the insert inside the cage is by multiple pieces of cage/housing with threaded connections are screwed together with a rubber gasket to provide a fluid seal. It has been found that the gasket leaks when in service, and the assembly of threaded connections are prone to premature failure under the stresses imposed by pumping operation. The assembly of multiple pieces of cage/housing with threaded connection is referred in U.S. Pat. No. 2,294,568A.

Any such failure requires the removal of the down hole pump incorporating the ball check valve to the surface for disassembly and repair, a costly and time-consuming operation. The use of the traditional ball receiving insert and the use of friction welding, conventional welding techniques or the threaded connections to join the component parts of the cage assembly of a ball check valve leads to similar problems.

SUMMARY OF INVENTION

The present invention comprises an improved insert, a one-piece cage and their assembly method for ball check valves which overcomes the foregoing and other problems long since associated with the prior art. The improved insert assembled in the one-piece cage provides an open flow without causing fluid restriction in comparison with the fluid flow area available through the seat. The improved insert keeps the ball received inside from rattling during reciprocating pump action there by preventing premature failure of the insert. The improved insert is positioned inside the cage cavity whose inside diameter is bigger than the outside diameter of the insert there by creating a more fluid flow area. The ball receiving insert is retained in place within the one-piece cage by a fluid seal screw thread connection there by preventing the insert from undergoing pre-stress caused by other assembly processes. The improved cage comprises a unitary, i.e., one-piece construction eliminating the need for assembling multiple pieces of cage/housing together.

In accordance with more specific aspects of the invention, the insert preferably comprises a unitary, i.e., a one-piece construction. The insert may be formed from hard, tough, wear and corrosion resistant material sold under the trademark STELLITE®, however, other, similar materials may be used in the practice of the invention, if desired. Similarly, the improved cage comprises a unitary, i.e., a one-piece construction that may be formed with a high strength and high corrosion resistant materials.

Other aspects and features of the present disclosure will become apparent to those ordinarily skilled in the art, upon review of the following description of the specific embodiments of the disclosure.

The present disclosure will be better understood having regard to the drawings in which:

BRIEF DESCRIPTION OF THE DRAWINGS

FIG. 19 represents a variation of the features of the insert of FIG. 14;

DESCRIPTION

Figure 7:
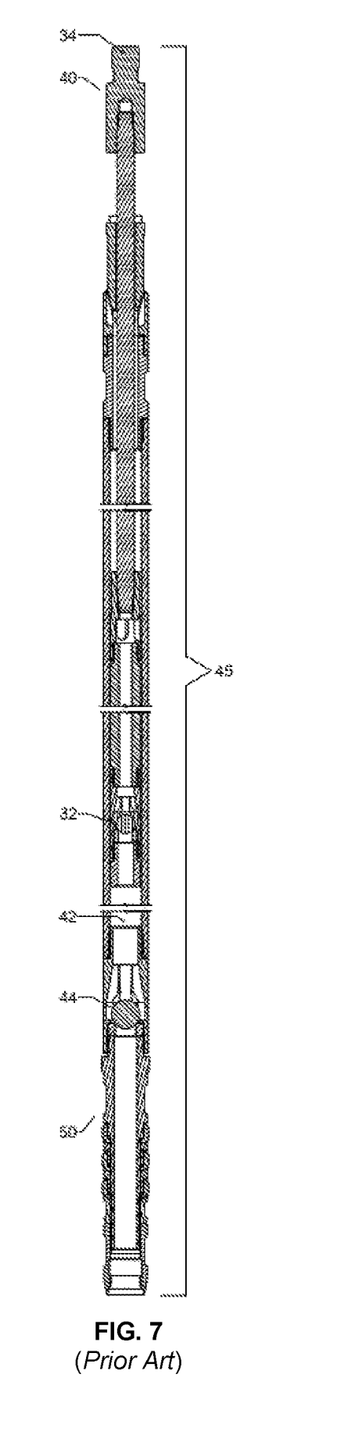
FIG. 7 is a side cross-sectional view of a sucker rod pump assembly used to recover fluids from a well in a subterranean earth formation. Traveling assembly is shown positioned inside the standing assembly.
Figure 8:
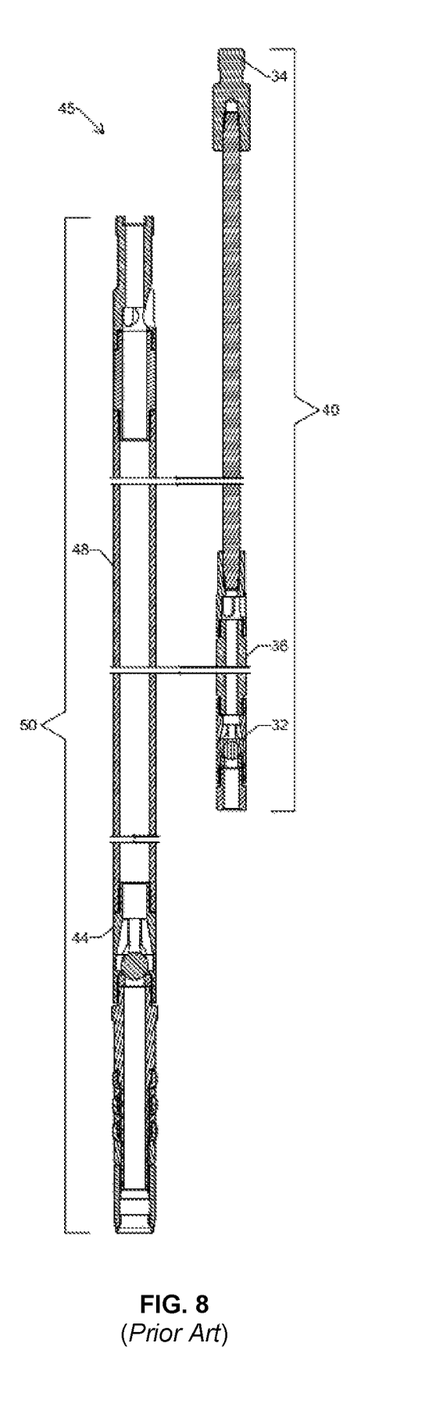
FIG. 8 is an exploded side cross-sectional view of a sucker rod pump assembly of FIG. 7 in accordance with the prior art.

In an artificial lift system, a sucker rod pump 45 is used to draw fluid to the surface using a reciprocating pump action. A sucker rod pump in general comprises of a standing assembly 50 and a traveling assembly 40 of FIG. 7 and FIG. 8. Referring to FIG. 7, traveling assembly 40 is securely positioned inside the standing assembly 50. The upper end of the traveling assembly 34 is connected to the sucker rod string. The rod string in turn is connected to a surface unit that provides a reciprocating pump action. The reciprocating action of the pumping unit causes the traveling assembly 40 to move upward and downward thereof. A traveling ball check valve 32 is located either above or below the traveling assembly 40 and a standing ball check valve 44 is located at the lower portion of the standing assembly 50. The upward and downward movement of the traveling valve 32 inside the pump intake chamber 42 draws fluid to the surface.

Further detailing, on the upstroke the ball check valve in the traveling valve 32 closes thereby causing fluid situated above the traveling valve 32 to be moved upward. Simultaneously, the ball check valve of the standing valve 44 opens there by allowing fluid to enter the portion of the pump barrel located between traveling valve and the standing valve. This portion of the pump barrel located between the traveling valve and the standing valve may be referred to as "pump intake" 42 of FIG. 7. On the downstroke, the ball check valve 32 of the traveling assembly 40 opens thereby allowing fluid to pass through the traveling valve so that it can be lifted upwardly upon the next reciprocation thereof. Meanwhile, the ball check valve 44 of the standing assembly 50 closes thereby preventing downward movement of fluid therethrough.

Figure 1:
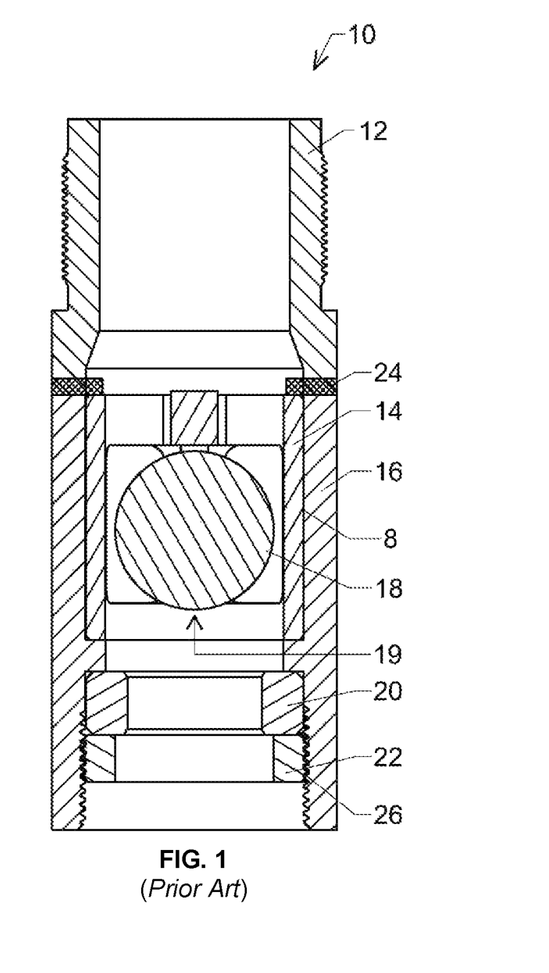
FIG. 1 is a side cross-sectional view showing an insert and a cage/housing assembly in accordance with the prior art.
Figure 2:
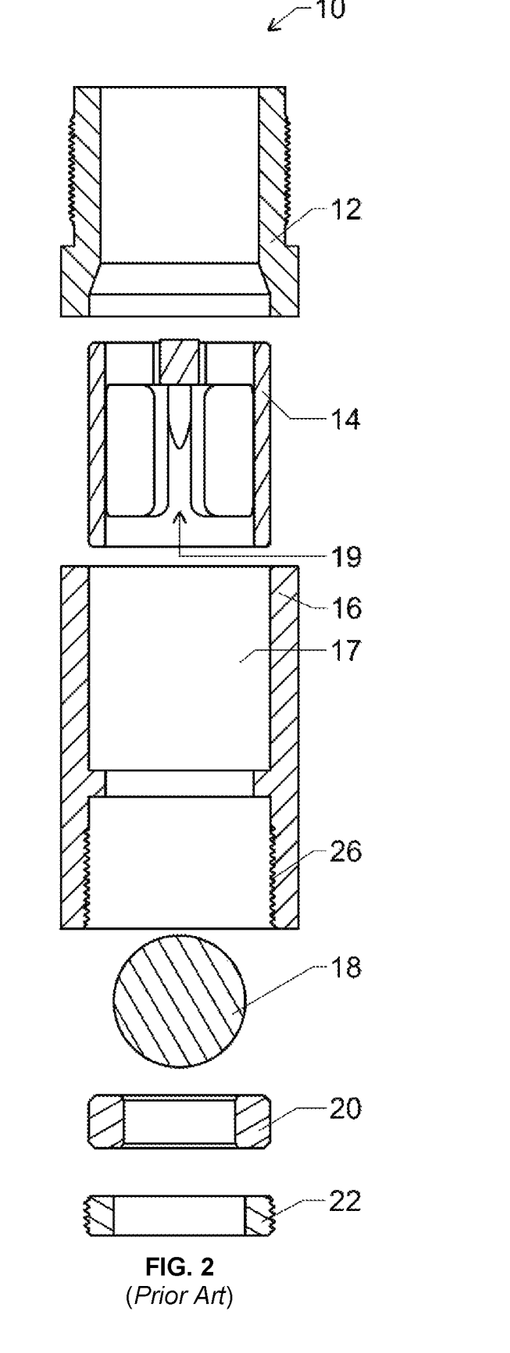
FIG. 2 is an exploded side cross-sectional view of FIG. 1 showing an insert, two pieces of cage/housing, ball, seat and seat plug in accordance with the prior art.
Figure 3:
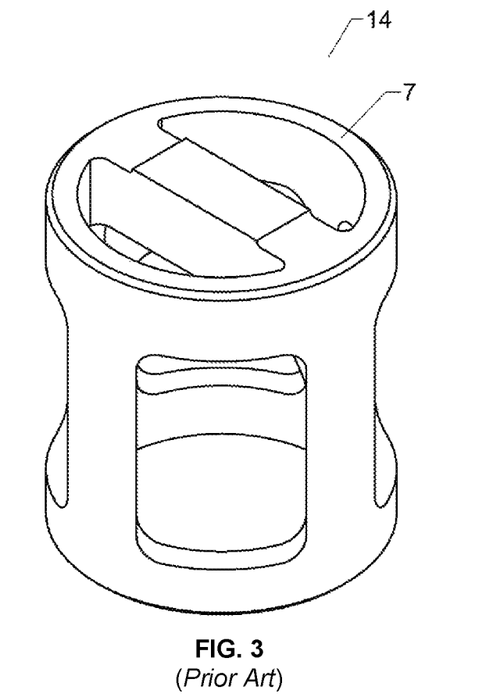
FIG. 3 is a perspective view of the insert used in accordance with the prior art.
Figure 4:
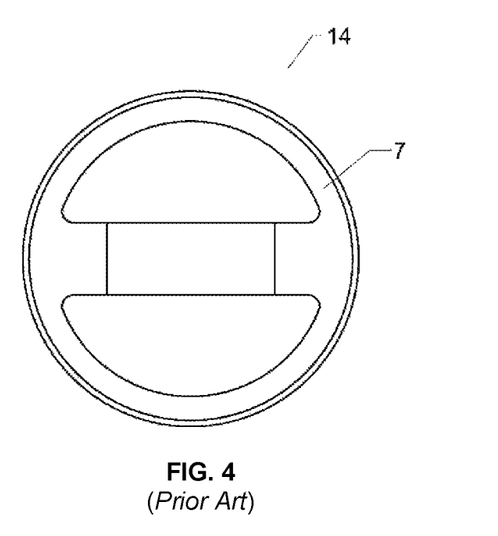
FIG. 4 is a top view of the insert of FIG. 3.

In general, ball check valves comprise a vertically oriented cylindrical cage and a ball positioned in the cage for reciprocation to open and close the valve. the cage comprises of ball guides and ball stop to keep the ball inside the cage. In other cases and according to prior art, as referred to in FIG. 1 the ball 18 is positioned in an insert 14 and the insert is securely held inside the cage/housing 16. A seat 20 is positioned below the ball which provides a seating surface for the ball to sit while providing a fluid seal. The seat 20 is held in its place with a seat plug 22 screwed and torqued against the seat underneath using a screw thread connection 26. The insert 14 is held inside cavity 17 of the cage 16 using interference or shrink fit. A shrink fit 8 is formed by making the outside diameter of the insert equal to or slightly bigger than the inside diameter of the cage/housing cavity 17 of FIG. 2. Interference fit causes radial stress on the ball receiving insert. It is found that these radial compression stresses cause the insert to crack. After the insert is secured in the cage 16 the rest of the cage assembly is done by friction welding 24 cage 12 to cage 16 as referred in FIG. 1. The friction welding prevents the insert from moving upward during the movement of the ball inside the insert. It is found that the friction welded cage breaks apart at the welded region when installed in high pressure deeper well bores causing the ball check valves to fail inside the pump.

Figure 5:
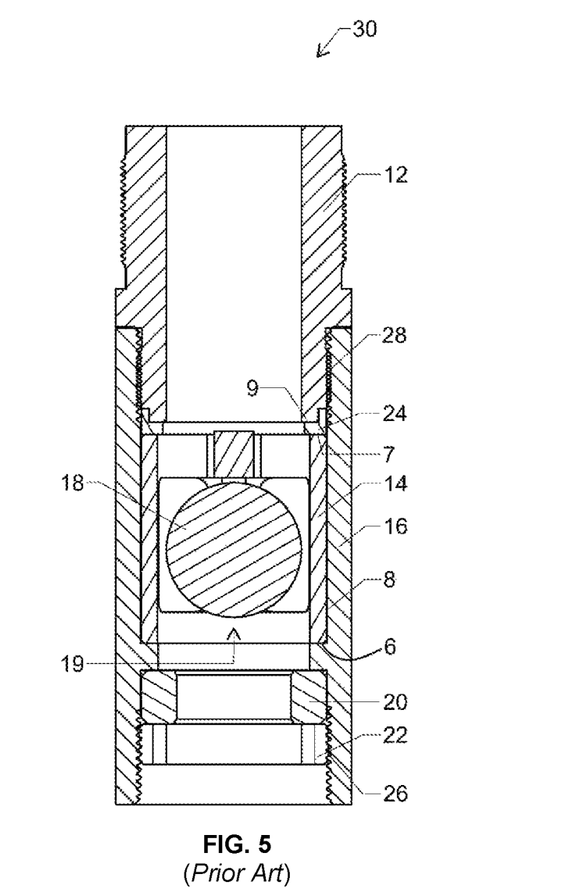
FIG. 5 is a side cross-sectional view of a four-piece insert guided cage assembly in accordance with the prior art.
Figure 6:
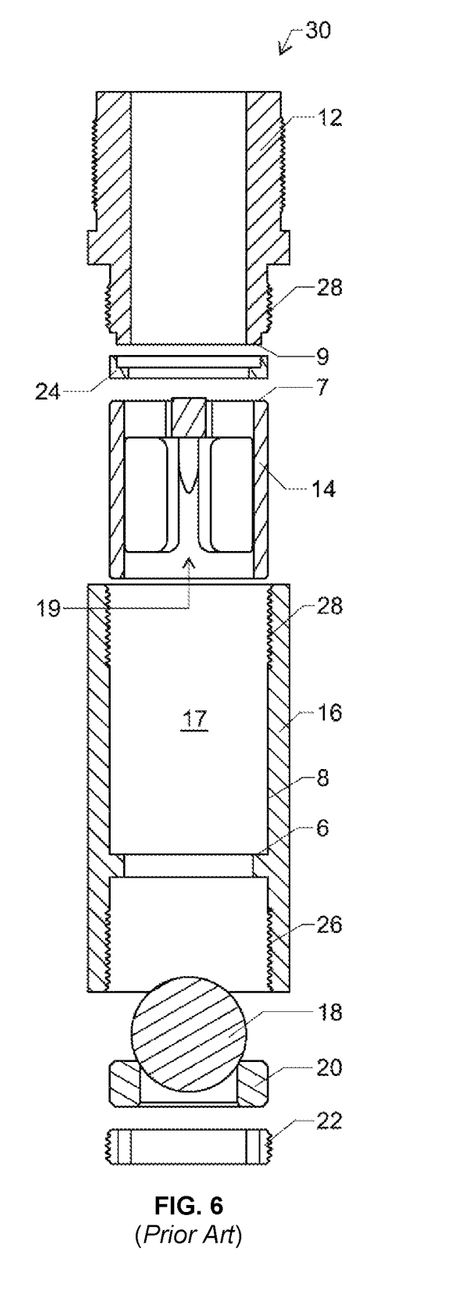
FIG. 6 represents exploded side cross-sectional view of FIG. 5 showing an insert, two pieces of cage/housing, ball, seat and seat plug in accordance with the prior art.

FIG. 5 refers to an alternate method for insert and cage assembly according to prior art. The insert 14 is dropped inside the cage 16 against a shoulder 6. The shoulder 6 prevents the insert from moving further down. Cage 12 is screwed and torqued into cage 16 by keeping a gasket 24 in between the top ring face 7 of the insert and bottom face 9 of the cage 12. The assembly of cage 12 and cage 16 is formed by the screw threads 28 keeping the insert 14 from moving upwards during the movement of the ball inside the insert bore 19. It has been found that the gasket leaks when in service, and the assembly of threaded connections are prone to premature failure under the stresses imposed by the pumping operation.

DESCRIPTION OF THE PREFERRED EMBODIMENT

Figure 9:
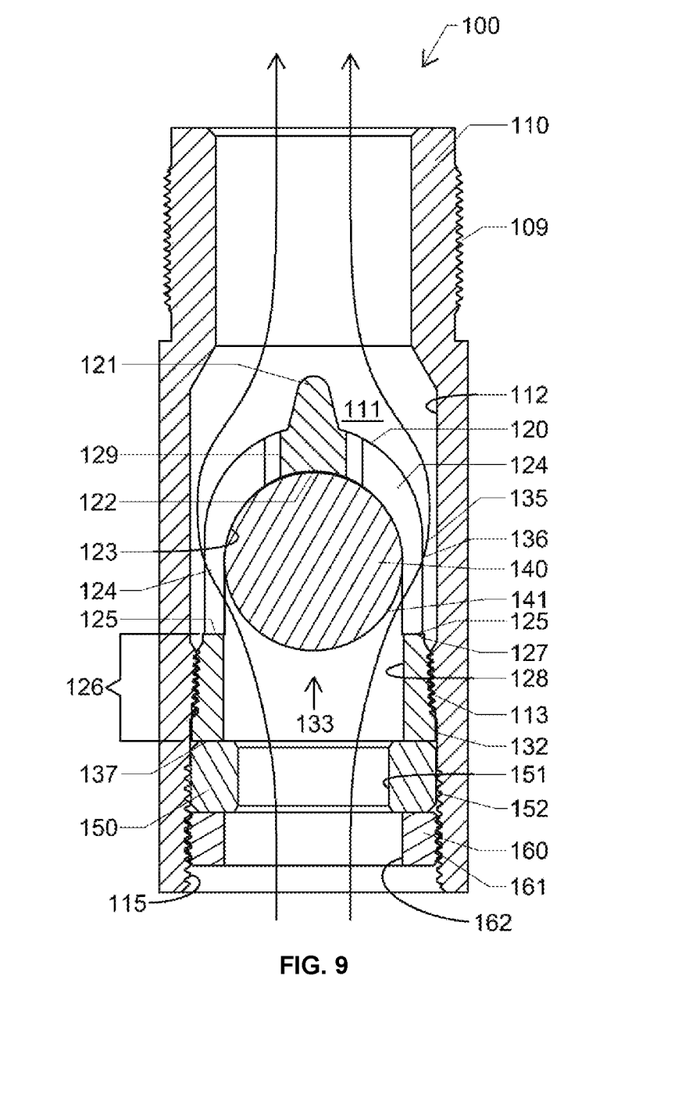
FIG. 9 is a side cross-sectional view of the ball check valve assembly showing the insert, one-piece cage and their assembly with the ball unseated and in contact with the stop, incorporating the preferred embodiments of the present invention.
Figure 10:
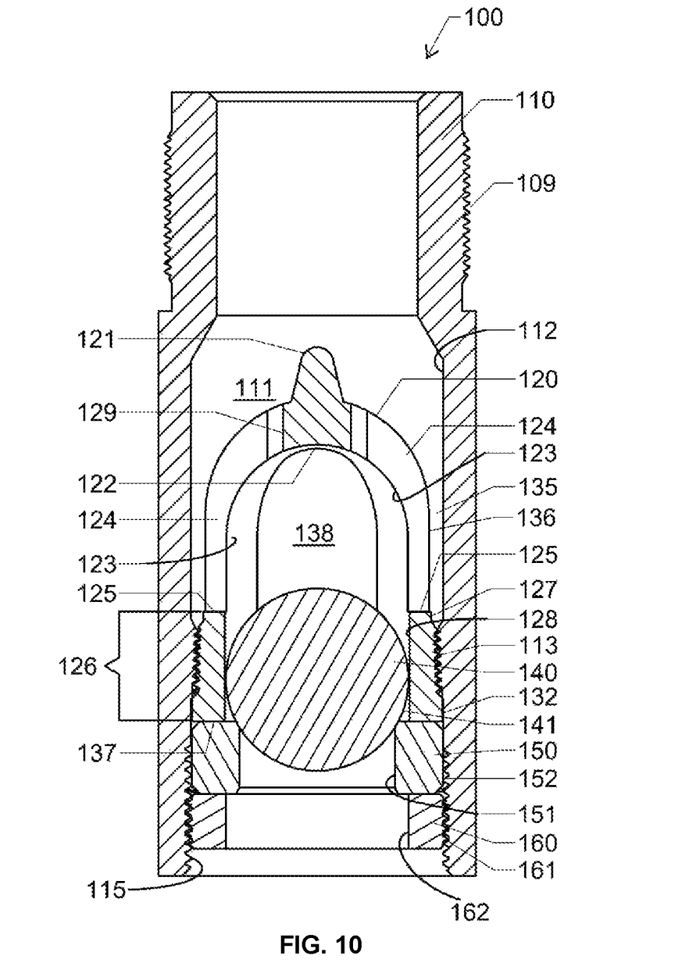
FIG. 10 is a side cross-sectional view like FIG. 9, showing the ball seated in the seat.
Figure 11:
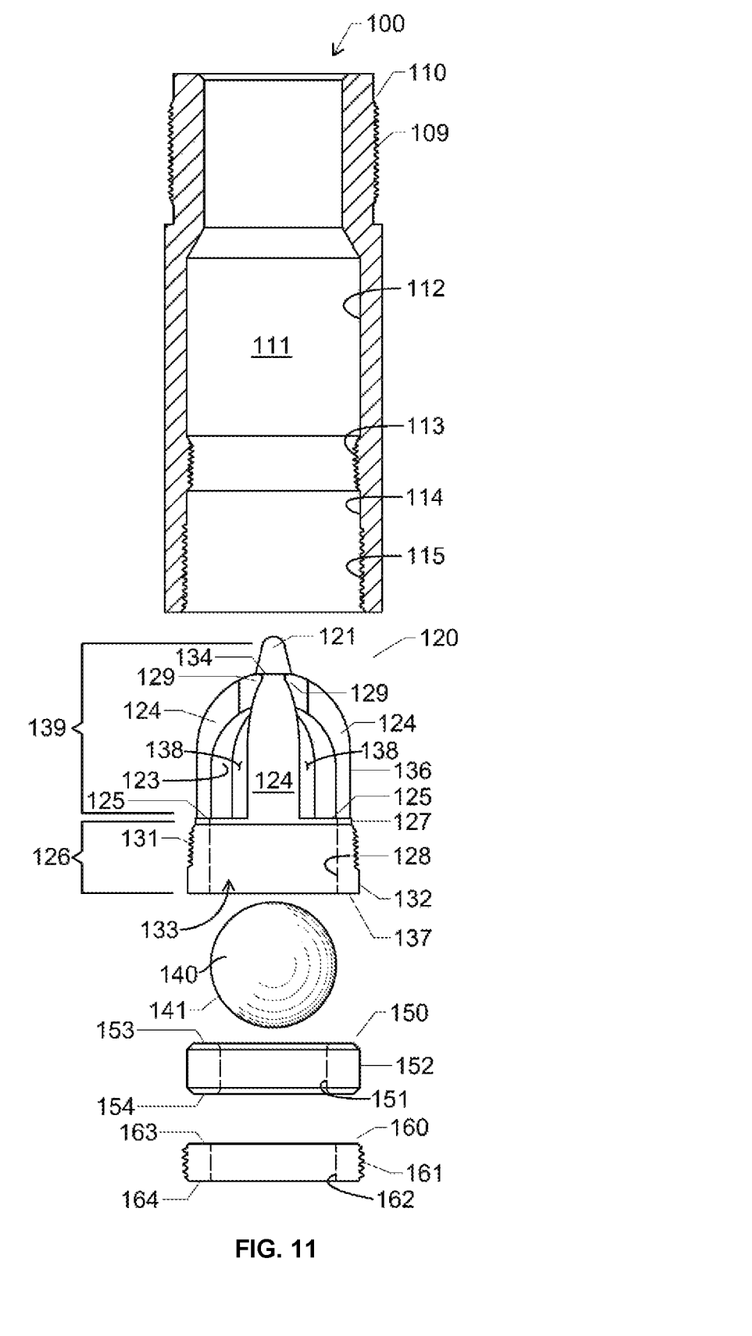
FIG. 11 is an exploded view illustrating the ball check valve assembly shown in FIG. 9 and FIG. 10, comprising of a side sectional-view of the one-piece cage and side view of the insert, ball, seat and seat plug in accordance with the preferred embodiments of the present invention.

Referring now to the drawings, and particularly to FIG. 9, there of, there is shown a ball check valve assembly 100 comprising the preferred embodiment of the present invention. The ball check valve 100 comprises an improved insert 120 and an improved one-piece cage 110 for the ball check valves. The improved cage comprises a unitary, i.e., a one-piece construction eliminating the need for assembling multiple pieces of cage together. The one-piece cage 110 has an insert receiving cavity 111 formed at the top end of the fluid seal thread 113 and there by extended upwards as also shown in FIG. 11.

The cage assembly 100 includes an insert 120 which is formed from a hard, tough, wear resistant material. Preferably, the insert 120 is formed from a material sold under the trademark STELLITE®, however other suitable materials may be used in the practice of invention, if desired. Importantly the insert 120 comprises a unitary, i.e., a one-piece construction.

Figures 12, 13:
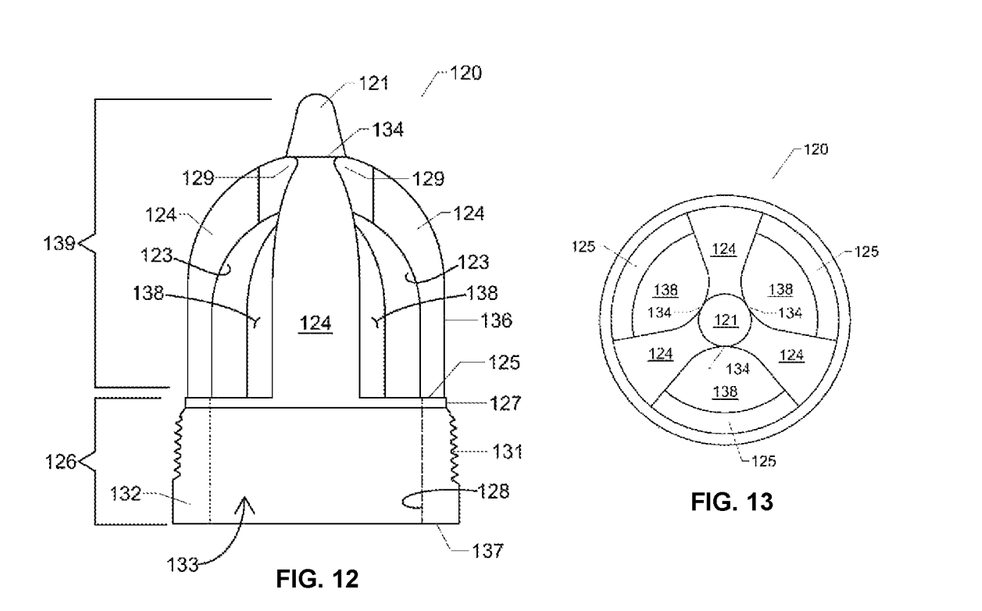
FIG. 12 is a side view of the insert of FIG. 9 with the ribs/ball guides shown perpendicularly inclined with respect to the base of the insert.
FIG. 13 is a top view of the insert of FIG. 12.
Figure 14:
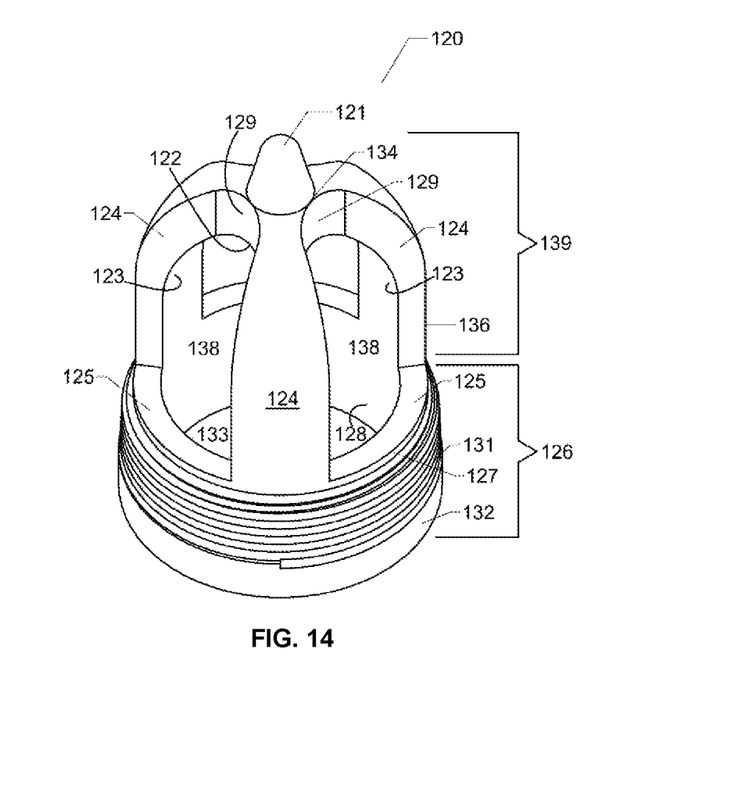
FIG. 14 is a perspective view of the insert of FIG. 12 in accordance with the present invention.

Referring to FIG. 12 and FIG. 14, The unitary insert 120 comprises a bottom ring 132 at the lower end thereof which extends upwards to form a fluid seal threads 131. The end of threads 131 extends to form a top ring 127 from which vertically spaced ribs 124 are formed extending upwards. The ribs 124 extend upwards and converge at the top towards the longitudinal axis forming a dome shaped ball stop 122. The converged ribs form circumferentially spaced arched side openings 138. The side openings 138 span from the top face 125 of the top ring 127 to the point of convergence 129 of the insert.

Figure 16:
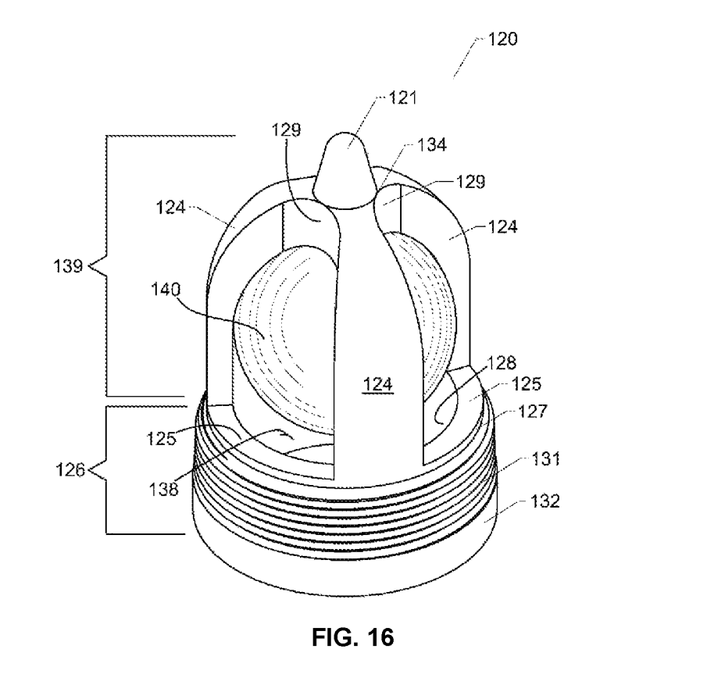
FIG. 16 is a perspective view like FIG. 15, showing the ball valve unseated and in contact with the stop.
Figure 17:
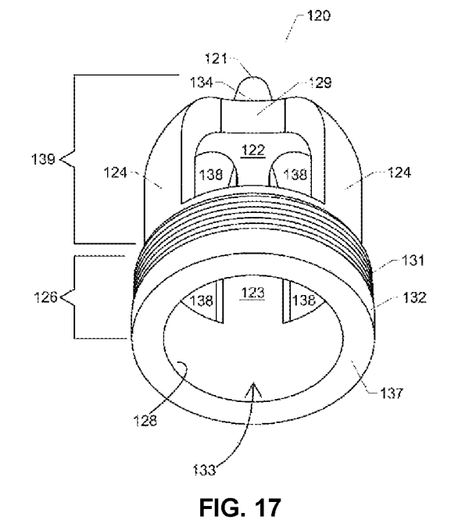
FIG. 17 is a bottom perspective view of the insert of FIG. 12.
Figure 19:
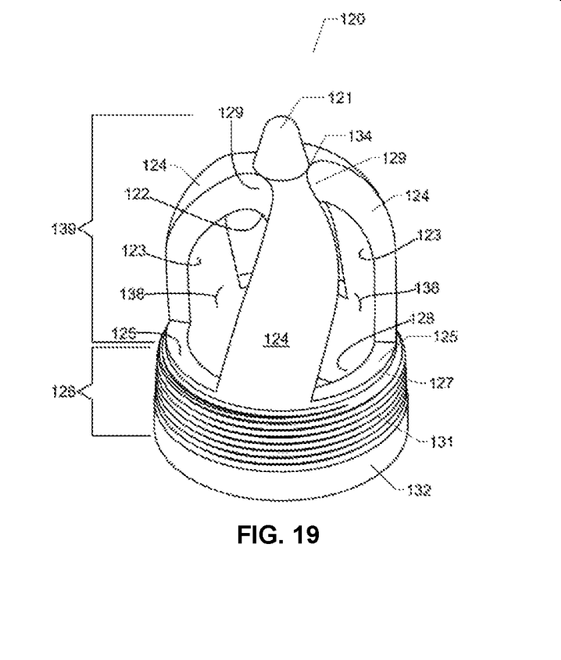
FIG. 19 is a perspective view of the insert with its ribs/ball guides helically inclined in accordance with the present invention.

As best shown in FIGS. 14, 17 and 19, the ribs 124 extend upwards either perpendicularly or inclined helically to the base 126. The extended ribs converge at the insert's longitudinal axis forming a dome shaped cavity. As shown in FIG. 17 the ribs 124 extend upward forming an inward arch 122 is referred to as the ball stop. The bottom surface 123 of the ribs 124 are converged at longitudinal axis to provide a smooth hemi-spherical stop surface 122 for engaging and restraining upward movement of the ball 140 as shown in FIG. 16. The convergence of the ribs as explained form circumferentially spaced, full open arched windows for the fluid to exit outwardly and upwards there by eliminating obstruction in the fluid flow. An upwardly directed conical protrusion 121 is formed and extended from the point of convergence 134 of the ribs 124. This conical protrusion 121 directs the fluid upwards and reduces the formation of eddies or vortices in the fluid flow and there by lowering pressure drop.

Figure 15:
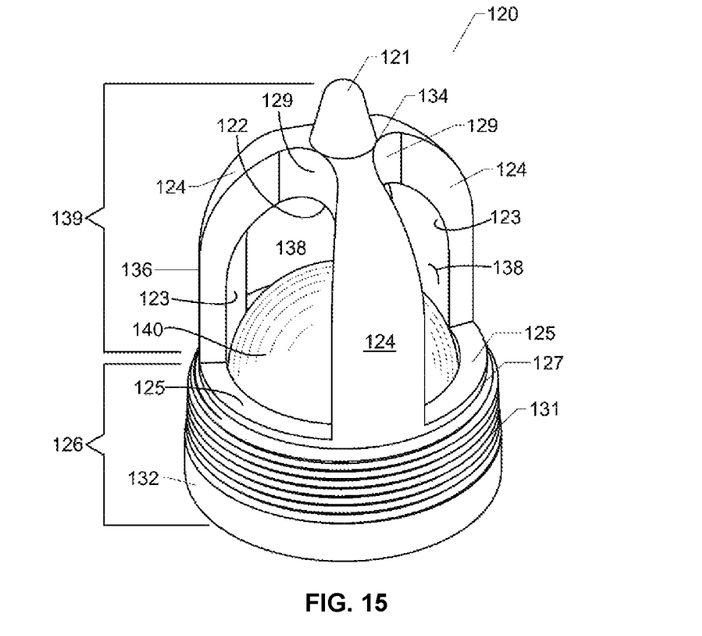
FIG. 15 is a perspective view of the insert of FIG. 12 with a ball valve seated in place.

As best shown in FIG. 12 and FIG. 14 the base 126 of the insert is formed in the shape of a ring to provide a cylindrical passageway 133 along the insert bore 128. The insert bore 128 receives a ball valve 140 that can move upwards and downwards inside the insert. The valve ball 140 can sit on the annular seat 150 to close the passageway 133 as shown in FIG. 15, or it can be displaced upwards by the fluid pressure from below as shown in FIG. 16. When the ball 140 is unseated, fluid in the passageway 133 flows outwardly through the side openings 138 and around the ball 140 thereby moving upwardly. The diametrical clearance between the valve ball 140 and the inside diameter of the insert bore 128 may be less than 0.381 mm [0.015 in]. Such small clearance prevents the ball from rattling inside the insert bore when fluid flows through the passageway 133, thereby reducing the failure of the insert, due to the ball beating the ball guides 123.

As best shown in FIG. 11, the unitary cage 110, i.e., a one-piece in construction, has a cavity 111 that receives the unitary insert 120. The cage cavity according to an aspect of the disclosure may begin at the top end of the thread feature 113 and there by extended upwards. The screw threads 113 in the cage correspond to the screw threads 131 on the insert 120. These screw threads 113 and 131 are of primarily taper thread form that can hold the insert in place simultaneously forming a fluid seal connection between the cage and the insert. However, other thread forms and any suitable means may be used including, but not limited to threaded connection in the practice of invention, if desired.

As represented in FIG. 9 and FIG. 11, the insert when screwed into the corresponding cage thread 113, the ribs, ball stop, conical protrusion forming section 139 of the insert is received in the cage cavity 111. The outside diameter 136 of the insert ribs 124 will remain smaller than the inside diameter 112 of the cavity 111. There by creating an annular region 135 for the fluid to flow around the ball outwardly and there by exiting upwardly. This annular region 135 corresponds and supplements to the fluid flow area to provide a full open zero restriction fluid flow around the ball valve. Thereby promoting high volumetric fluid flow therethrough.

The one-piece cage 110 as described earlier supports a cylindrical seat 150 positioned underneath the insert 120, allowing the ball valve 140 to seat thereby providing a fluid seal. The seat 150 is held in place by a seat plug 160 screwed and torqued against the seat forming a threaded connection between seat plug thread 161 and cage thread 115.

Figure 18:
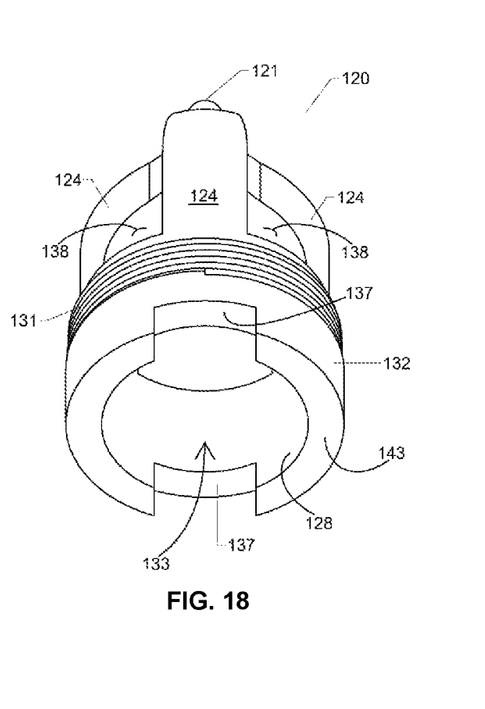
FIG. 18 represents a variation of the bottom perspective view of the insert of FIG. 12; showing clutches on the bottom side of the insert.

As best shown in FIG. 18 there are clutches 143 formed on the bottom of the base ring 137 extending downwards. These clutches 143 can be engaged with a torqueing tool to screw and torque the insert 140 into cage 110. However, various modifications and variations of these features may also be implemented. These clutches 143 are removed by machining process to form a smooth seal face 137 on the bottom of the insert. The process of removing clutches is carried out after the establishment of secure fluid seal threaded connection 113 between the insert 120 and one-piece cage 110.

What is claimed is:

1. A ball check valve insert and a one-piece cage used in downhole pumps of artificial lift systems, the ball check valve insert comprising:
    circumferentially spaced apart ribs corresponding to the top of the base extending upwards from the base and converging towards the longitudinal axis of the insert to form arched side openings spanning from the top of the base of the insert to the point of convergence;
    one or more external screw threads below the ribs on an outside diameter of the base of the ball check valve insert configured to be screwed in a cavity, of the one-piece cage, having an internal screw threads, wherein an inside diameter of the cavity is bigger than the outside diameter of the ribs of the ball check valve insert;
    the ribs converging towards the longitudinal axis of the ball check valve insert to form a hemispherical ball stop;
    an upwardly directed conical protrusion extending from the point of convergence of the ribs forming the ball stop; wherein the check valve insert having a passageway to receive a ball is movable therein between two positions, one of which closes an insert bore against movement of fluids therethrough and the other allowing fluid to move through.

2. The ball check valve insert of claim 1, wherein the inside diameter of the insert bore is 0.381 mm or less plus the diameter of the ball that fits into the insert bore.

3. The ball check valve insert of claim 1, having a base ring having circumferentially spaced clutches on a bottom surface.

4. The ball check valve insert of claim 1, wherein the ribs are inclined at an angle and helically extended upwards from the base to form helically arched fluid flow side openings spanning from the top of the base to the point of convergence of the ribs forming the ball stop towards the longitudinal axis of the ball check valve insert.

5. The ball check valve insert of claim 1, wherein the ball check valve insert is a one-piece in construction and formed from a hard, tough, wear resistant and corrosion resistant material.

6. The ball check valve insert of claim 1, wherein the one-piece cage having an insert receiving cavity having an internal screw threads wherein the insert is screwed in; wherein the internal screw threads below the cage cavity corresponds to one or more threads on the base of the ball check valve insert.

7. A method of manufacturing a ball check valve using an insert and a one-piece cage, assembly comprising:
   providing a one-piece unitary cage having an insert receiving cavity and having a screw thread corresponding to a screw thread on a base of the insert, wherein the insert is configured to be screwed in the screw threads of the insert receiving cavity, wherein an inside diameter of the cavity is bigger than outside diameter of ribs of the insert;
   wherein diametrical clearance between valve ball and inside diameter of an insert bore is less than 0.381 mm and having arched side openings spaced circumferentially and a passageway extending axially therethrough;
   providing the ball having an outside diameter substantially equal to the inside diameter of the passageway extending through the insert; and
   positioning the ball in the passageway of the insert for axial movement therein between two positions, one of which secures the insert against passage of fluids therethrough.

8. The method of manufacturing a ball check valve assembly according to claim 7, wherein the step of securing an unitary insert inside a cage is carried out by screw thread connection; wherein one or more clutches on the insert are engaged with a torqueing tool to screw and torque the insert into one-piece cage.

9. The method of manufacturing a ball check valve assembly according to claim 8, wherein the clutches on bottom of the insert are removed by machining to form a smooth seal face on the bottom of the insert; wherein the process of machining out the clutches is carried out after the insert is screwed and torqued into the one-piece cage creating a fluid seal threaded connection between the insert and the one-piece cage.

10. The method of manufacturing a ball check valve assembly according to claim 7, wherein the insert forms an annular flow region between the outside diameter of the insert ribs and the inside diameter of the cage cavity.

* * * * *